(12) United States Patent
Fetescu et al.

(10) Patent No.: US 6,560,966 B1
(45) Date of Patent: May 13, 2003

(54) METHOD FOR OPERATING A POWER PLANT HAVING TURBINE COOLING

(75) Inventors: Mircea Fetescu, Ennetbaden (CH); Erhard Liebig, Laufenburg (DE); Jean-Pierre Rickli, Uster (CH); Franz Stirnimann, Thalwil (CH)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/645,548

(22) Filed: Aug. 25, 2000

(30) Foreign Application Priority Data

Aug. 25, 1999 (DE) .......................... 199 40 174

(51) Int. Cl.[7] .............................. F02C 3/30; F02C 6/18; F02C 7/16
(52) U.S. Cl. ............................ 60/775; 60/782; 60/806; 60/728; 60/736
(58) Field of Search ............................ 60/39.05, 39.55, 60/39.07, 39.182, 39.75, 728, 736, 775, 782, 785, 806

(56) References Cited

U.S. PATENT DOCUMENTS

| 4,424,668 | A | * | 1/1984 | Mukherjee | 60/39.182 |
| 4,932,204 | A | * | 6/1990 | Pavel et al. | 60/736 |
| 4,949,544 | A | * | 8/1990 | Hines | 60/726 |
| 5,095,693 | A |   | 3/1992 | Day |  |
| 5,369,951 | A | * | 12/1994 | Corbett et al. | 60/39.55 |
| 5,490,377 | A |   | 2/1996 | Janes |  |
| 5,579,631 | A | * | 12/1996 | Chen et al. | 60/39.05 |
| 5,661,968 | A | * | 9/1997 | Gabriel | 60/39.182 |
| 5,685,158 | A | * | 11/1997 | Lenahan et al. | 60/726 |
| 5,689,948 | A | * | 11/1997 | Frutschi | 60/39.05 |
| 5,697,208 | A | * | 12/1997 | Glezer et al. | 60/39.07 |
| 6,085,514 | A | * | 7/2000 | Benim et al. | 60/39.05 |

FOREIGN PATENT DOCUMENTS

| DE | 29510720 U1 | 10/1995 |
| DE | 19508018 A1 | 9/1996 |
| DE | 19545308 A1 | 6/1997 |
| DE | 19645322 A1 | 5/1998 |
| EP | 0348676 A2 | 1/1990 |
| EP | 0519304 A1 | 12/1992 |

* cited by examiner

*Primary Examiner*—Ted Kim
(74) *Attorney, Agent, or Firm*—Burns, Doane, Swecker & Mathis, L.L.P.

(57) ABSTRACT

In a method for operating a gas turbo group, partial streams of compressed air are cooled in cooling air coolers and are used as cooling air for thermally highly stressed components of the gas turbo group. The cooling air coolers are constructed as steam generators. Steam generated in the cooling air coolers is fed in part to the gas turbo group and is expanded there while providing usable power, while another part of the steam is fed into the cooling system, where the steam displaces air, which air then becomes available again to the gas turbine process. In this way, the steam generated with the help of heat removed from the cooling air is re-used.

7 Claims, 6 Drawing Sheets

METHOD FOR OPERATING A POWER PLANT HAVING TURBINE COOLING

FIELD OF THE INVENTION

This application claims priority under 35 U.S.C. §§ 119 and/or 365 to Patent Application No. 199 40 174, filed in Germany on Aug. 25, 1999; the entire content of which is hereby incorporated by reference.

The invention relates both to a method for operating a power plant, and to a power plant for employing the method. The power plant in question has at least one gas turbo group with at least one compressor, at least one combustor, and at least one gas turbine, whereby one part of the air compressed in the compressor is branched off, cooled in a cooling air cooler, and used as a coolant for the gas turbo group. The heat removed from the compressed air is used at least in part for generating superheated steam that is introduced at least in part at a suitable place into the gas turbo group.

BACKGROUND OF INVENTION

Many variations of gas turbine power plants and methods for operating such power plant systems are known. In a simple, open gas turbine process, the system essentially consists only of a compressor and a combustor followed by a gas turbine. In order to operate the system, processed (for example filtered, de-iced, heated or cooled), ambient air is introduced into the compressor. The compressed air is then conducted further into the combustor where the enthalpy of the compressed air is increased by combustion. The resulting combustion gases are expanded in the gas turbine, whereby the released energy is returned through a rotor shaft to the compressor and also to a generator.

The exhaust gases of the first gas turbine in principle still contain sufficient oxygen to be usable as preheated air for a second combustion. In order to increase the efficiency of such a system, a second combustor and a second gas turbine are therefore positioned behind the first gas turbine for so-called "sequential combustion." The gas enthalpy increases again in this second combustor, and the resulting combustion gases are expanded in the second turbine.

The first turbine is the high pressure turbine and the second turbine a low pressure turbine. Both turbines are usually installed on a common shaft.

In combination systems, the waste gases from one or more gas turbines that have been expanded almost to atmospheric pressure are used in a waste heat steam generator for generating steam. This steam is used in a separate, closed steam cycle for generating additional mechanical or electrical energy to operate a steam turbine. Part of the steam in the steam cycle also can be used as process steam or for a remote heating system, or the like.

One problem in the operation of such power plant systems is cooling. The blades of the shaft and housing of the gas turbines are in constant contact with hot combustion gases from the combustion chambers. Depending on their position and the material of the various parts, cooling is necessary to ensure mechanical integrity during operation. For the cooling of these components, several systems that use coolants such as air, steam, or other coolants are known.

In a method to which the invention at hand is also related, compressed air is removed from the compressor and is supplied to the turbines for cooling. By using part of the compressed air for turbine cooling, the amount of air involved in the thermodynamic working process of the gas turbine is automatically reduced. This results in lower gas turbine output power and efficiency. The cooling air also could result in an increase in gas turbine energy losses, for example because of the so-called dilution effect, i.e., due to the mixing losses caused by the cooling air entering the turbine gas stream.

During the construction of high-performance gas turbines, it is therefore necessary to minimize the amount of cooling air. On the one hand, this can be achieved by using more exotic materials and special temperature protection coatings for the components to be cooled, which, however, is associated with higher investment costs. An alternative for minimizing the amount of cooling air amount is to reduce the temperature of the compressed air externally, before the air is used for turbine cooling. This results in a higher heat exchange since the temperature differential between the coolant and the metal surface of the parts to be cooled is increased. An equivalent cooling therefore requires a smaller amount of cooling air. The gas turbine performance is increased by this since less air bypasses the thermodynamic gas turbine process.

Various methods to cool the compressed cooling air externally are known.

On the one hand, there are so-called quench coolers in which the compressed air is cooled by injection of water. However, this method is associated with a high thermal stress of the air coolers. The gas turbine cooling air also could be contaminated by contaminants in the water, which could lead to catastrophic consequences. To prevent this, large amounts of highly purified water are required for this method. In addition, strict control of the air temperature after mixing is extremely difficult. However, a highly accurate determination of the cooling temperature is necessary in order to prevent damage to the gas turbine.

In another method for cooling the compressed air, cooling elements are used. The removed heat is released into the atmosphere, for example, the coolant used in a heat exchanger is re-cooled by air fans. With this method, the removed heat is lost to the gas turbine process.

DE 195 08 018 A1 furthermore shows another cooling method in which the removed heat can be reused. In the system described in DE 195 08 018 A1, which is hereby incorporated by reference in its entirety, there is a combination system with a gas turbine cycle and a complete, closed water steam cycle. In this method suggested there, the air is cooled in air coolers that are integrated into the water steam cycle. Part of the steam generated in a waste heat steam generator is used as a coolant for the air cooler, whereby the heat removed from the cooling air is used to superheat the steam. The superheated steam then can be returned into the water steam cycle, for example, into the waste heat steam generator, or can be used for injection into the gas turbine. Unfortunately, this method requires a combination cycle with a closed water steam cycle, which again is associated with high investment costs. This method also cannot be used during the times in which the components of the water steam cycle, for example, the steam turbine or waste heat steam generator, are unavailable. It is furthermore not suitable for the phased concept of a system which only functions as a combination system in the last upgrade phase.

EP 0 519 304, which is hereby incorporated by reference in its entirety, furthermore describes how, in a cooling air cooler, steam generated by indirect heat exchange is introduced into a combustor of a gas turbo group and is expanded in a turbine while supplying useful power. However, especially when a gas turbo group is used whose combustion chamber is operated with contemporary premix burners with a lean premixed combustion for minimizing noxious substances, it is not easy to add larger amounts of steam into the combustor. This may lead to a destabilization of the flame in connection with a significant increase in emissions of partially burned and unburned substances and dangerous fluctuations in combustor pressure. In addition, the addition of large amounts of water steam to the hot gas increases the heat transfer to the components to be cooled, which therefore has a counterproductive effect in that it again increases the cooling air requirement. EP 0 519 304 explicitly discloses a further heating of the generated steam in a waste heat steam generator; according to the generally known state of the art, this step in the process certainly could be eliminated.

SUMMARY OF THE INVENTION

The invention is therefore based on the task of creating an alternative to known method in which the required cooling air is effectively cooled, and the heat removed hereby used again, while avoiding the above mentioned disadvantages.

According to the invention, this objective is realized with a method for operating a power plant having at least one gas turbo group with at least one compressor, with at least one combustor, and at least one gas turbine, whereby one part of the air compressed in the compressor is branched off, cooled in a cooling air cooler, and used as a coolant for the gas turbo group, and whereby pressurized feed water is added into the cooling air cooler, and heated with the heat removed from the compressed air, evaporated, and the pressurized steam generated in this way is superheated, and whereby the steam generated in this manner is at least in part added to the gas turbo group and is expanded there while supplying useful power, in which in the invention part of the generated steam is branched off before or after the superheating and is added into a cooling air conduit system that conducts the compressed and cooled air.

The basic idea of the invention is that feed water is directly introduced into the cooling air cooler in which the air which was removed from the compressor is cooled, and the heat removed from the compressed air is used to heat and evaporate the feed water and to superheat the generated steam. Part of the steam generated in this way can be introduced, on the one hand, in a known manner into the gas turbo group at a suitable place, preferably upstream from an initial turbine. This partial stream can be introduced directly into the working medium of the gas turbo group or it can be mixed with a quantity of fuel. A combination of these two variations would also be possible. This partial stream is expanded in the turbine while supplying power. Another part is mixed with the cooling air in the cooling system and there displaces cooling air which is then available for combustion, which also results in an increase in performance and efficiency. The steam content in the coolant furthermore increases the heat transfer in the cooling channels of the highly stressed components, which offsets the increased external heat transfer due to the steam content in the working gas in a first approximation. On the other hand, it is extremely disadvantageous for the mass stream of the steam to be introduced into the cooling system in its entirety: the mass stream of the steam generated in the cooling air cooler is highly variable in operation. An addition of this steam to the cooling air line again reduces the steam generation because of the decreasing cooling air mass stream. As a result, serious transient processes may develop. Strong fluctuations of the steam content in the coolant medium result in fluctuations of the heat transfer in the cooling channels of the components to be cooled. On the one hand, this may lead to damage. On the other hand, the cooling configuration then must represent a compromise between air cooling and a coolant with high steam content, which would be far removed from a favorable design for either steam or air cooling. The process according to the invention offers an advantage exactly for this case, in that a quantity of steam, which is undesireable in the cooling system, or transients of the quantity of steam, which have negative effects in the cooling systems, are fed directly into the gas turbine, where this quantity of steam continues to perform useful work. The steam mass stream to be introduced into the cooling channels is regulated by means of various control elements. This helps to a great extent to separate the steam mass stream introduced into the cooling system from the actual steam production.

Since the evaporation of the feed water takes place directly in the cooling air cooler, this method can be used both for simple, open gas cycles as well as for combined cycles. This means that the gas turbines can be used independently from the availability of a waste heat steam generator or other components of the water steam cycle. Overall, this results in a greater availability of the total system.

In principle, standardized evaporators can be used as cooling air coolers so that the construction of such a system has relatively low investment costs.

The method according to the invention furthermore provides the opportunity to very precisely control the cooling air temperature, which is safer for the gas turbine. This is particularly advantageous if the gas turbine is operated with a partial load. The sensitivity of the gas turbine with respect to changes in environmental conditions may also be better taken into account.

It is preferred that the feed water for steam generation and superheating the steam is passed once through the cooling air cooler in counterflow. It is specifically this technique that makes it possible to regulate the temperature of the cooling air exiting the cooling air cooler simply by varying the quantity of the feed water.

In a multi-stage installation of the gas turbo group, it makes sense to branch off the cooling air separately from the compressor for each turbine of the gas turbo group, at a suitable pressure. Naturally, the compressor may also include several sequential compressor stages in which correspondingly compressed air is branched off between the compressor stages. The air with the different pressures is then preferably cooled in separate cooing air coolers and is fed to the turbine or turbine stage working at the corresponding pressure. By using separate cooling air coolers, the optimum temperature of the cooling air can be set independently for each turbine.

The steam generated in the cooling air coolers also can be used to preheat other components or media, for example the feed water or fuel.

In another preferred embodiment, a waste heat steam generator is connected, parallel to the cooling air coolers, to the feed water cycle, which is integrated in the waste stream of the gas turbines. This makes it possible to generate an additional quantity of superheated steam. Although such an arrangement is associated with higher investment costs, it has the advantage of recovering not only the waste heat of the air coolers but also, at least to a major degree, the waste gas heat, i.e., the overall process takes place with a minimum of energy losses. The gas turbine output energy and efficiency are therefore also increased significantly in a simple, open cycle. With this embodiment it should be noted in particular that, in contrast to the methods known from the state of the art, the waste heat steam generator and the cooling air cooler are not positioned one after another, whereby steam is generated in the cooling air cooler which is then superheated in the waste heat boiler, or conversely; rather, both devices are arranged parallel, and superheated steam is thus generated independently, both in the waste heat steam generator and in the cooling air cooler. Because it is possible to work only with one of these two options for steam generation, the system is significantly more flexible, which again results in a higher overall availability of the system on the whole.

BRIEF DESCRIPTION OF THE DRAWINGS

The invention is described with more detail below with the help of exemplary embodiments in reference to the enclosed drawings. These schematic drawings show the following.

DETAILED DESCRIPTION OF THE INVENTION

Figure 1:
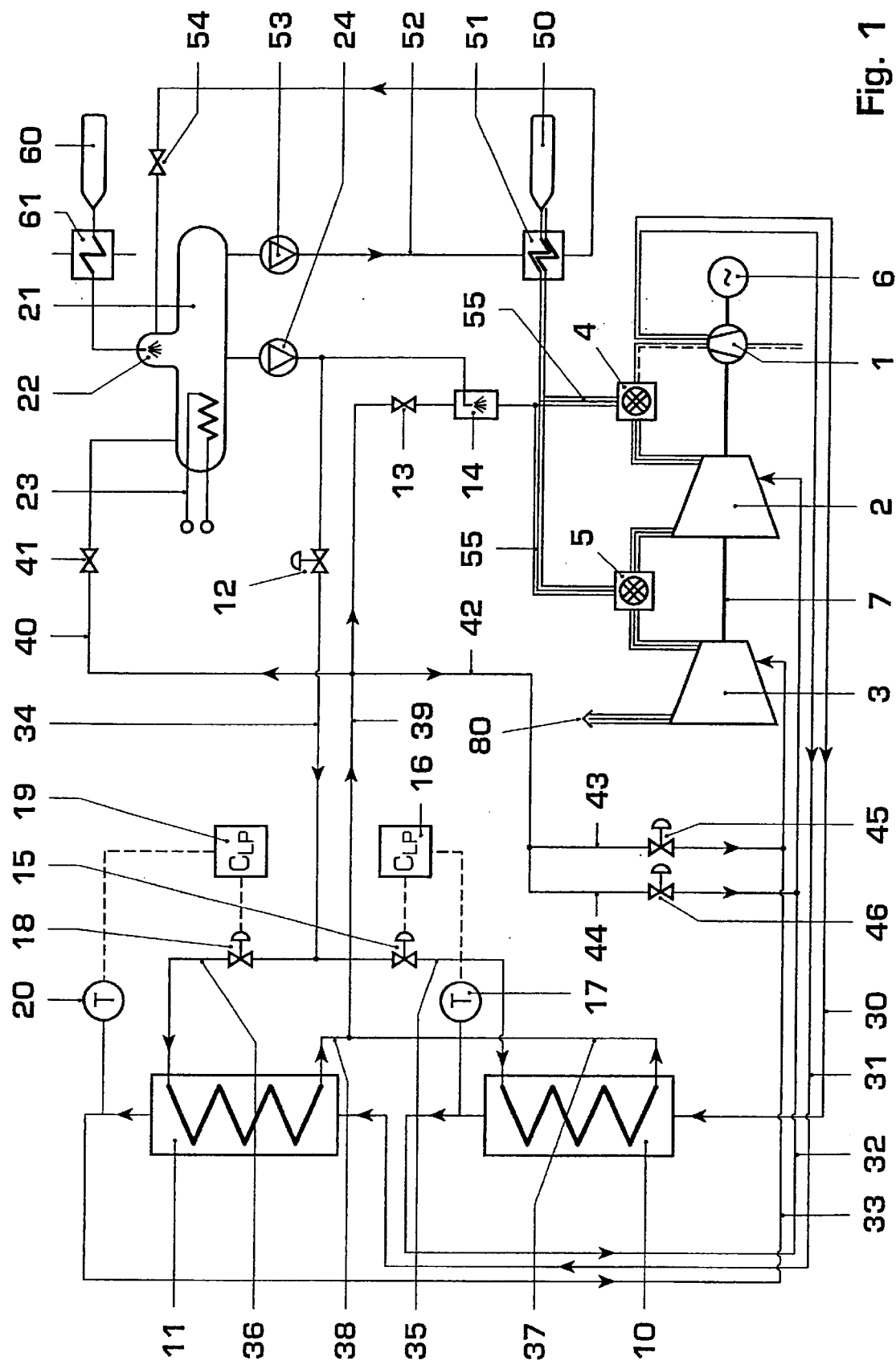
FIG. 1 is a block switching diagram of a gas turbo group with sequential combustion and two separate coolers for the cooling air of the turbines.

The gas turbo group 1–5 shown in FIG. 1 includes a compressor 1, a first turbine (high pressure turbine) 2, and a second turbine (low pressure turbine) 3, which are, by means of a shaft 7, connected to each other and to a generator 6, as well as a first combustor 4 between the compressor 1 and the high pressure turbine 2, and a second combustor 5 between the high pressure turbine 2 and the low pressure turbine 3.

The compressor 1 draws in air, compresses it, and feeds it to the first combustor 4. Here, fuel is added to the combustion air via a fuel line 55, and the fuel/air mixture is burned while increasing the enthalpy of the compressed air. The combustor may be, for example, a ring combustor with several burners arranged in ring shape around the turbine, as is known, for example, from DE 195 08 018 A1.

The hot gas produced during the combustion is expanded in the high pressure turbine 2, whereby part of the energy of the hot gas is transformed into rotation energy that is used via shaft 7 for driving compressor 1 and generator 6. Following this first expansion, the partially expanded hot gas still contains sufficient oxygen to be mixed again with fuel in a second combustor 5 and burned, while again increasing the enthalpy. The resulting hot gas is fed into the low pressure turbine 3, where it is further expanded and also supplies the shaft 7 with rotation energy.

In order to cool the thermally highly stressed components of turbines 2, 3, compressed air is branched off at compressor 1, whereby highly compressed air is branched off for the high pressure turbine 2, and air with a lesser compression is branched off for the low pressure turbine 3. This air is then passed via compressor air lines 30, 31 through two separate "once-through" steam generators 10, 11, whereby the coolant is conducted in counterflow in one pass through the respective cooling air cooler 10, 11.

The coolant introduced into these cooling air coolers 10, 11 includes degassed and preheated water that is added via corresponding feed water supply lines 34, 35, 36 from a feed water container 21, the water then being heated, evaporated, and superheated in cooling air cooler 10, 11, so that superheated steam is then available at each of the water-side outlets of coolers 10, 11. The cooling air coolers 10, 11 are filled with feed water from the feed water container 21 through a high pressure pump 24.

The feed water inflow for both cooling air coolers 10, 11 can be reduced or blocked off completely together by a valve 12. The exact quantity of feed water is regulated separately for each cooling air cooler through an associated control valve 15, 18 located respectively in a corresponding branch-off 35, 36 of the feed water supply line 34. The control is accomplished with a controller 16, 19 that detects the discharge temperature of the cooling air with an associated temperature measuring device 17, 20, compares it with a set value of the cooling air temperature, and changes the added quantity of feed water depending on this deviation. This permits a an accurate regulation of the cooling air temperature. Separate control valves furthermore permit an optimum adjustment of the cooling air temperature of the high pressure and low pressure turbine 2, 3 independently from each other.

The steam present at the outlet of the cooling air cooler 10, 11 is removed through 37, 38, 39 and is made available for various uses.

A first part of the steam is first cooled, to the extent necessary, to a predetermined value in an injection cooler 14 by injecting feed water, and is then fed to the gas turbo group 1–5, i.e., is injected into turbines 2, 3 or the combustors 4, 5. The steam injection may take place either directly in the combustion zone or a short distance in front of the combustion zone in the compressor outlet, or in the hot gas behind the combustor zone, depending on the effect to be achieved in each individual case. Another possibility includes first mixing the steam with the fuel and introducing a mixture of steam and fuel into the combustor. Naturally, a combination of the various places for injecting steam also can be used. By injecting the steam, the turbine performance can be improved, since the mass stream in the turbine is increased while the compressor mass stream is kept constant. If the steam is injected into the primary zone of the flame, the greater local heat requirement also results in a lower flame temperature, reducing the NOx values. In this context, we refer to DE 195 08 018 and F. Kreitmeir, H. U. Frutschi and M. Vogel, "Wirtschaftliche Bewertung von Methoden zur NOx-Reduktion bei Gasturbinen und Kombikraftwerken" in ABB Review 1/1992, the disclosure of which is hereby incorporated by reference in its entirety. As a rule, the steam is injected into the first combustor 4. Following expansion in the high pressure turbine, the steam mixed with gas turbine waste gases is reheated in the second combustor 5, further increasing output power and efficiency.

A direct injection of the steam into the second combustor 5 is advantageous if the available steam has a relatively low pressure that is not sufficient for injection into the first high pressure combustor.

A second partial stream of the generated steam is added through a connecting line system 42, 43, 44 into the cooling air lines 32, 33 that lead from the cooling air coolers 10, 11 to the associated turbines 2, 3. The amount of steam introduced into the cooling line 32, 33 may be controlled via valves 45, 46. The steam generated in the cooling air coolers easily fulfills the purity requirements for coolants used in the turbine area. The introduced steam displaces cooling air from the cooling air lines; this cooling air is available directly for combustion in the combustors, which additionally increases the performance and efficiency of the gas turbo group.

Another part of the steam can be returned through a line 40 and valve 41 into the feed water container 21 to be used there for preheating the feed water. In this way the feed water container 21 itself can be heated. But since the steam used for preheating the feed water loses its energy without participating in the gas turbine process, this part usually should be kept to a minimum.

The feed water container 21 is charged with fresh feed water through a feed water processor 60 in which the water, among other things, is demineralized, and through a feed water preheater 61. This fresh feed water is introduced into the feed water container 21 through a degasser spike 22 mounted on the feed water container 21.

The feed water preheater 61 is preferably a heat exchanger that uses the waste heat from auxiliary devices of the gas turbo group 1–5, for example, by removing the heat from the generator cooling system or the lube oil cooling system. By using waste heat from the auxiliary devices for preheating the feed water, less steam is required for preheating the feed water, and a greater quantity of steam is therefore available for injection into turbines 2,3, further improving the overall performance of the system and increasing its efficiency.

Part of the heated feed water can also be pumped through a pump 53 and a line 52 through a heat exchanger 51 in order to preheat the fuel 50. This water is then returned in the cycle through a valve 54 to the degasser spike 22 in the feed water container 21.

The exemplary embodiment shown in FIG. 1 is a relatively economical, compact construction that uses the available heat in the power plant as completely as possible. The entire system in principle could be started cold. Alternatively, the feed water in the feed water container 21 first could be preheated with an auxiliary heater 23. In power plants with several adjoining units, the feed water also could be easily kept warm by the waste heat from other power plant units or could be heated relatively quickly.

Naturally, it would also be possible to operate the invention without such a feed water container but with a system of lines that has been optimally designed. The only requirement would be that an adequate quantity of feed water be fed continuously from some feed water supply, for example directly from a feed water processing system, to the cooling air coolers.

Figure 2:
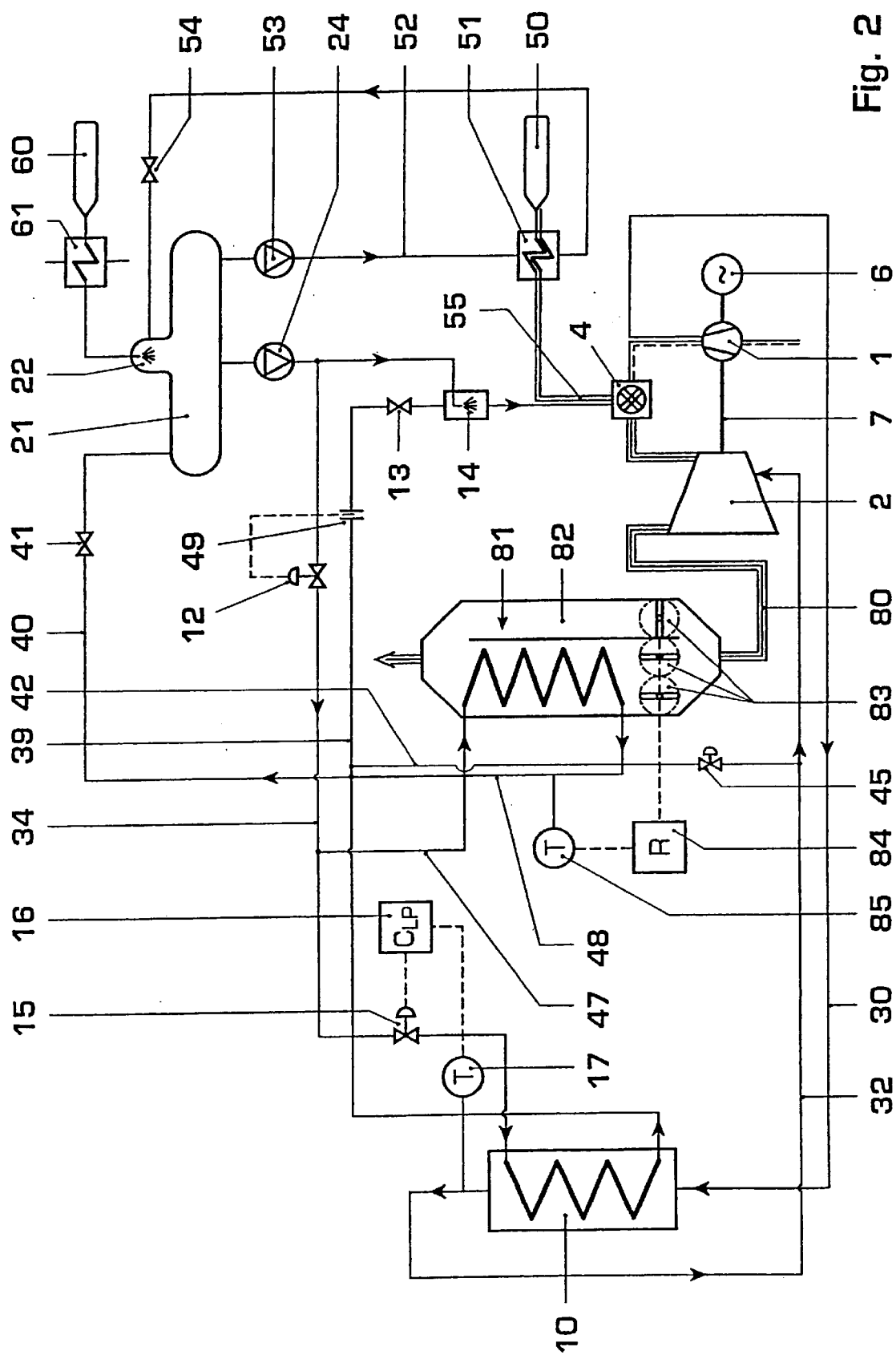
FIG. 2 is a block switching diagram of a system according to the invention with an additional waste heat steam generator and with a conventional gas turbo group without sequential combustion.

FIG. 2 shows another embodiment of a system according to the invention, whereby a conventional gas turbo group without a reheating of the working gas is portrayed. The system shown in FIG. 2 also includes a single cooling air cooler 10. In this exemplary embodiment, the waste gas stream 80 of turbine 2 includes an integrated waste heat steam generator 81 connected parallel to the feed water/steam cycle of the cooling air cooler 10. Accordingly, the feed water supply line 34 leading to the cooling air cooler 10 has a branch-off line 47 that leads into the waste heat steam generator 81. The steam generated in the waste heat steam generator 81 is then combined through a line 48 with the steam discharge line of the cooling air cooler 10. This produces an additional quantity of steam while utilizing the waste heat.

In order to regulate the total quality of steam, the throttle valve 12 is controlled through a measuring orifice 49 in the steam supply line 39 to the gas turbines. The injected steam quantity is regulated with valve 13, among other things, depending on the pump limit of the compressor, the turbine load and ambient temperature.

The temperature of the superheated steam produced in the waste heat steam generator 81 also can be determined with a bypass 82 and corresponding Venturi valves 83 in the waste heat steam generator. These Venturi valves 83 are controlled with a controller 84 that is connected with a steam temperature measuring device 85 that measures the output temperature of the steam.

The total quantity of steam is divided, as in the example in FIG. 1, into an initial partial stream that is fed through a valve 13 into the combustor 4, and into a second partial stream that is fed through a line 42 and a control element 45 into the cooling air line 32.

Naturally, it would also be possible to provide the system shown in FIG. 1 with a gas turbo group with sequential combustion and two cooling air coolers with a waste heat steam generator. In the same way, an entire group of combinations of these features is conceivable, as long as the thermodynamic conditions of the system would permit this to appear reasonable. These exemplary embodiments should not be used to limit the invention as characterized in the claims, but rather to explain it.

Both waste heat steam generators and cooling air coolers preferably use once-through steam generators. FIGS. 3–5 show additional exemplary embodiments. The steam generators 101 in each case are provided with a hot gas inlet 120 and a hot gas outlet 130. Inside the steam generator 101, pipe lines through which the feed water or steam passes are arranged accordingly.

Figure 3A:
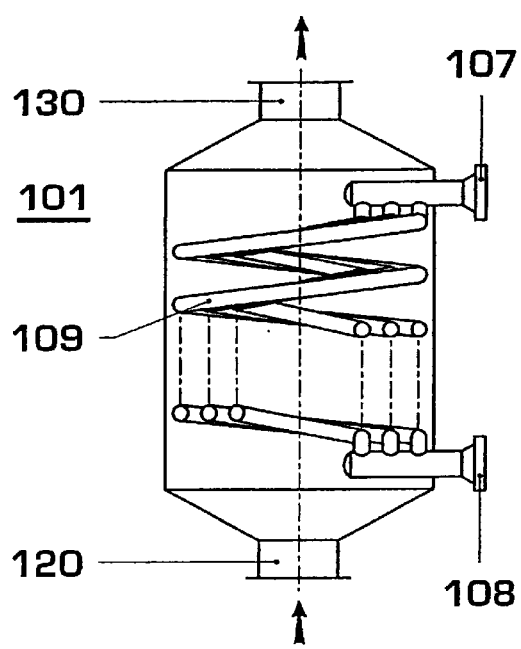
FIG. 3a is a section of a "once-through" steam generator with helical pipes.
Figure 3B:
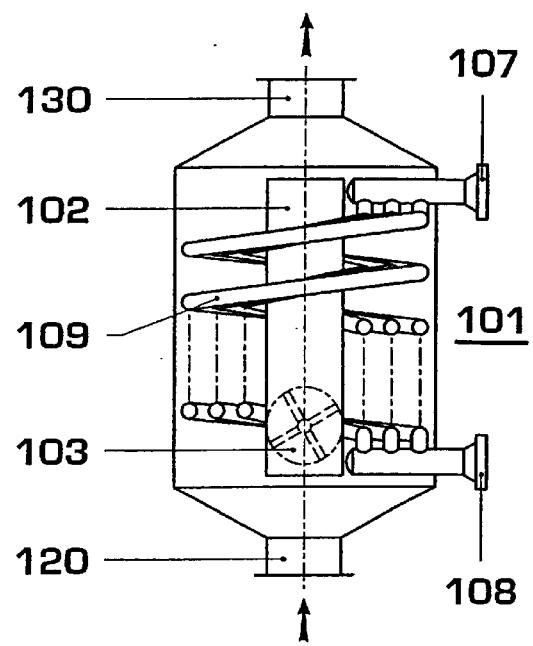
FIG. 3b is a section of a "once-through" steam generator according to FIG. 3a with a bypass for the hot gas stream.

In FIGS. 3a and 3b, the steam generator 101 in each case has pipes 109 that run helically in the opposite direction to the hot gas stream and extend from an upper feed water inlet 107 to a lower steam outlet 108. In contrast to FIG. 3a, the steam generator 101 in FIG. 3b has a bypass 102 through which the hot gas stream is able to bypass pipes 109 without generating steam. This bypass 102 can be closed off with a Venturi valve 103.

Figure 4A:
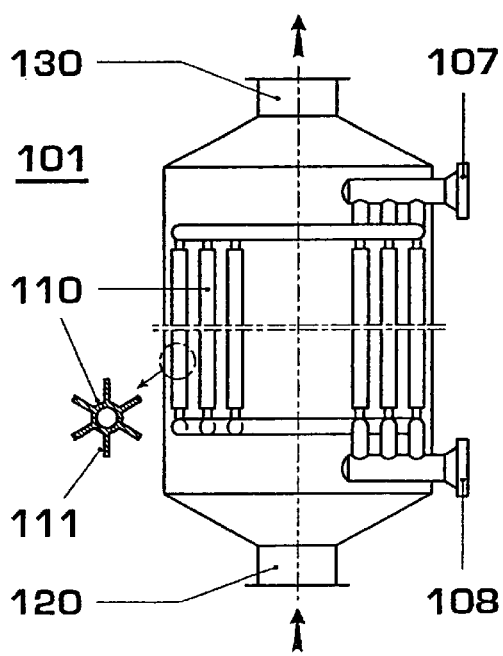
FIG. 4a is a section of a "once-through" steam generator with vertically positioned ribbed pipes.
Figure 4B:
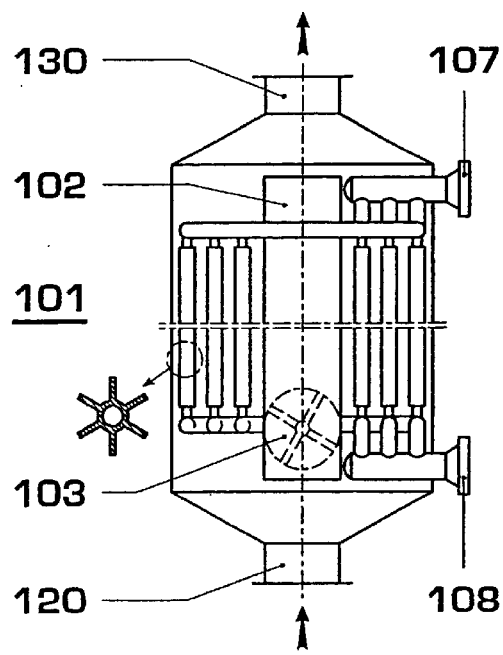
FIG. 4b is a section of a "once-through" steam generator according to FIG. 4a with a bypass for the hot gas stream.
Figure 5:
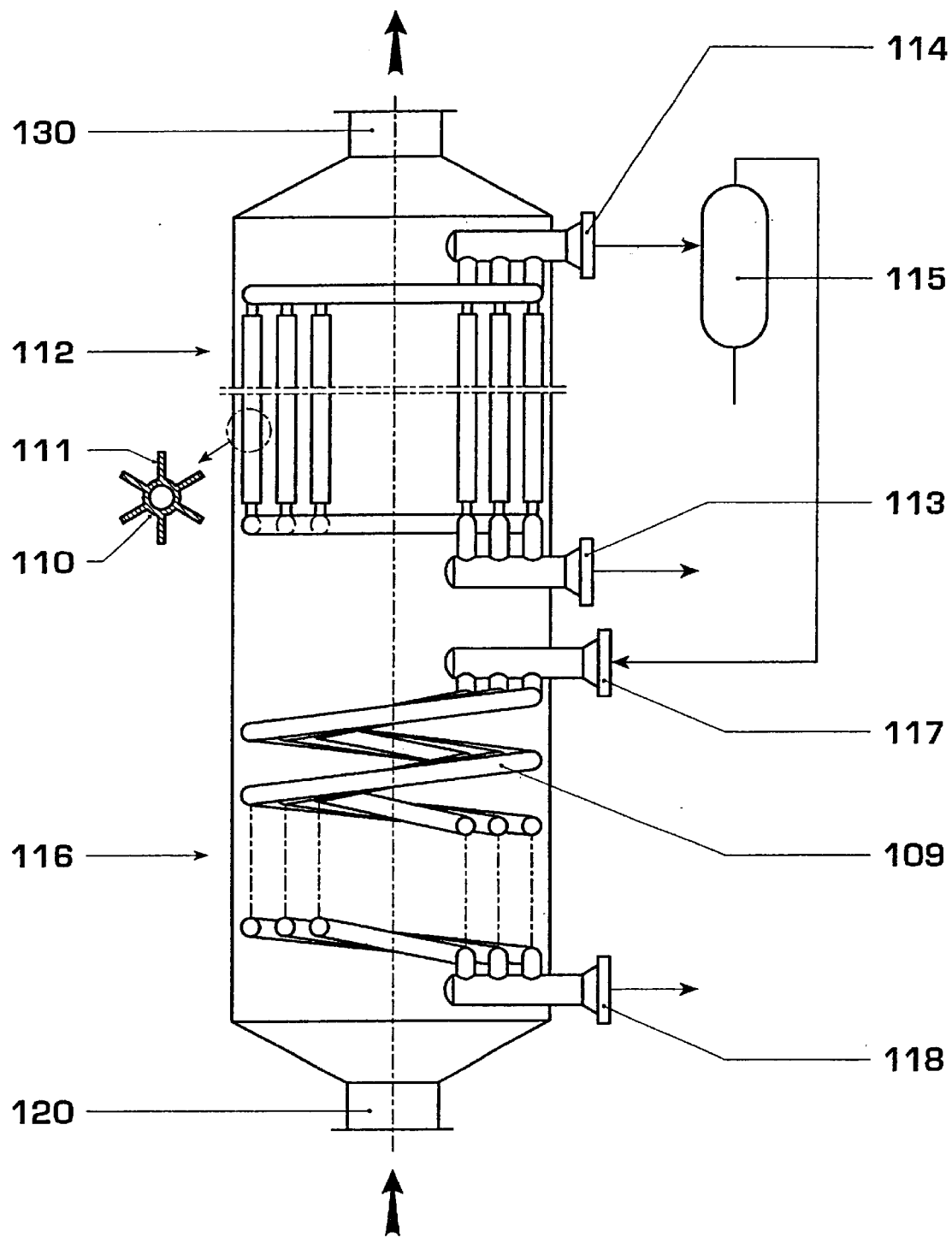
FIG. 5 is a section of a steam generator with an economizer evaporator stage and a superheating stage.

FIGS. 4a and 4b show steam generators 101 with vertically extending ribbed pipes 110. Ribbed pipes 110 are connected on the top with a common feed water inlet 107 and on the bottom with a common steam outlet 108. The ribbed pipes 110 are simple pipes provided with several ribs 111 oriented radially outward in a star shape, as is shown in cross-section in the left part of FIGS. 4a and 4b. FIG. 4a shows a steam generator 101 designed without a bypass, and FIG. 4b shows a corresponding steam generator 101 with a bypass. Naturally, the embodiments in FIGS. 3a and 3b could also be provided with ribs.

FIG. 5 shows a preferred embodiment that is provided in an area in front of the hot gas outlet 130 with a so-called economizer evaporator stage that has vertical ribbed pipes 110. Here the feed water is fed through a feed water inlet 113 on the bottom into the ribbed pipes 110 where it is then passed upwards, during which process the hot gas stream evaporates, and is then fed via a saturated steam outlet 114 into a water steam separation device 115 (Sulzer bottle). From there, the saturated steam is then fed into a steam inlet 117 of a superheating stage 116 located in the direction of the hot gas stream in front of the economizer/evaporator stage 112. This superheater stage 116 includes pipes 109 that extend helically opposite to the hot gas stream and lead from the superheater steam inlet 117 to a superheater steam outlet 118, where the superheated steam is removed.

With the method according to the invention, the heat of the cooling air, and possibly also the waste gas heat, are optimally used in a simple manner and returned to the gas turbine process with a minimum of energy losses. This additionally enables an increase in the output power and efficiency of gas turbines in an open, simple cycle.

Figure 6A:
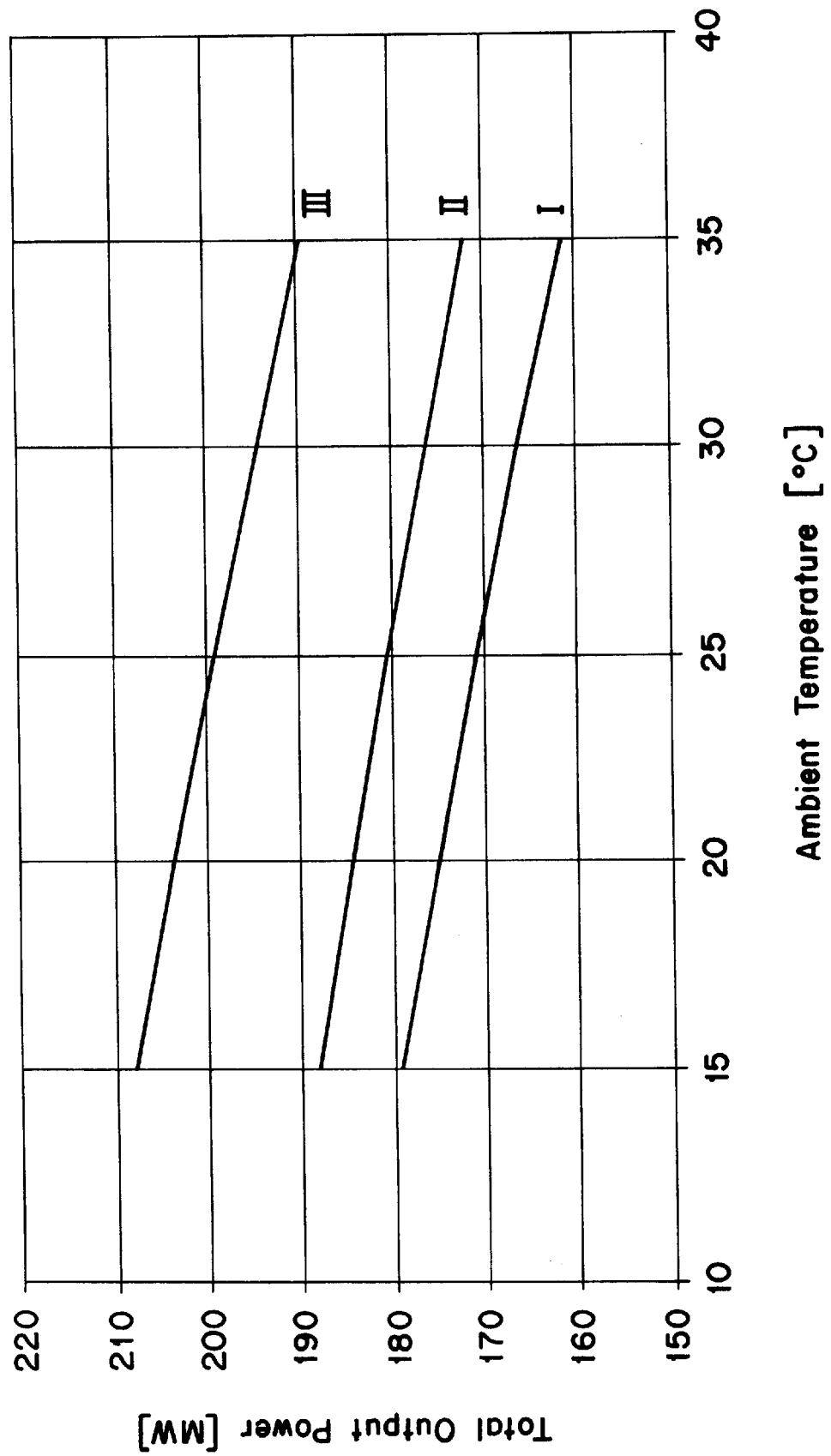
FIG. 6a is an exemplary diagram of the total output power of a gas turbo group according to the invention in relation to the ambient temperature.
Figure 6B:
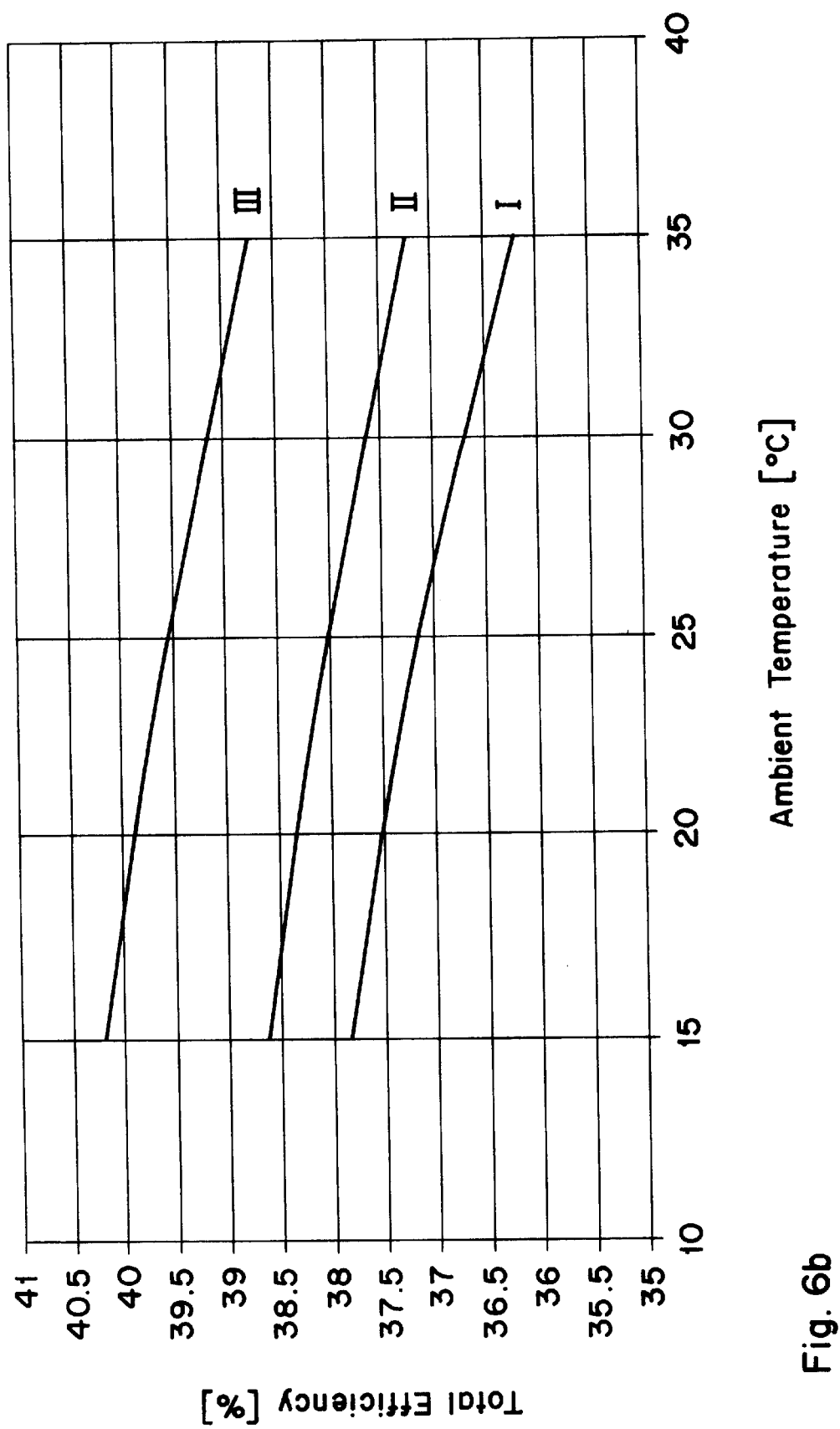
FIG. 6b is an exemplary diagram of the total efficiency of a gas turbo group according to the invention in relation to the ambient temperature.

Simple systems with open cycles, with and without the cooling air coolers according to the invention, can be compared with the help of the diagrams in FIGS. 6a and 6b. FIG. 6a shows the total output power, FIG. 6b the total efficiency in relation to the ambient temperature. Curve I in each case is from a system without the cooling air coolers according to the invention, curve II from a system with the cooling air coolers, and curve III from a system with cooling air coolers and an additional waste heat steam generator. All three systems are based on a GT24 gas turbine by ALSTOM Power. The diagrams show a different relationship to the ambient temperature, whereby, when the ambient temperature rises, the output power and efficiency ratio rise in a system with cooling air coolers according to the invention. This results in an additional economic advantage since the sensitivity of the gas turbine to ambient temperature can be partially offset.

Although this invention has been illustrated and described in accordance with certain preferred embodiments, it is recognized that the scope of this invention is to be determined by the following claims.

What is claimed is:

1. A method for operating a power plant, the power plant having at least one gas turbo group with at least one compressor, at least one combustor, and at least one turbine, said method comprising:
   branching off at least one part of compressed air in the at least one compressor, where the compressed air branches off to at least one cooling air cooler;
   cooling said compressed air in the at least one cooling air cooler;
   using said cooled compressed air as a cooling air in a coolant system of the at least one gas turbo group;
   adding pressurized feed water into the at least one cooling air cooler;
   heating and evaporating said pressurized feed water with heat removed from the compressed air while generating at least one pressurized steam flow in said at least one cooling air cooler;
   superheating said at least one pressurized steam flow;
   apportioning a first portion of said at least one pressurized steam flow generated in said at least one cooling air cooler into the cooled cooling air downstream of the cooling air cooler, with said first portion being regulated to be independent from the amount of pressurized steam flow generated in said at least one cooling air cooler; and
   bypassing a second portion of said at least one pressurized steam flow which is not apportioned into the cooled cooling air into a working fluid flow of the at least one gas turbo group.

2. The method of claim 1, comprising the operation of controlling a flow of pressurized feed water to maintain a specific temperature of the cooling air downstream the at least one cooling air cooler.

3. The method of claim 1, the method further comprising:
   branching off a part of compressed air at each of at least two different pressure levels;
   feeding each part of compressed air into an individual coolant system;
   providing at least one of the individual coolant systems with a cooling air cooler; and
   passing one part of the branched off compressed air through said at least one cooling air cooler.

4. The method of claim 3, further comprising:
   providing at least two of the individual coolant systems with an individual cooling air cooler; and
   passing the one part of the branched off compressed air through one of the cooling air coolers.

5. The method of claim 3, further comprising the operation of individually controlling a flow of steam into each of the coolant systems.

6. A method for operating a power plant, the power plant having at least one gas turbo group with at least one compressor, at least one combustor, and at least one turbine, said method comprising:
   branching off at least one part of compressed air in the at least one compressor, where the compressed air branches off to at least one cooling air cooler;
   cooling said compressed air in the at least one cooling air cooler;
   using said cooled compressed air as a cooling air in a coolant system of the at least one gas turbo group;
   adding pressurized feed water into the at least one cooling air cooler;
   heating and evaporating said pressurized feed water with heat removed from the compressed air while generating at least one pressurized steam flow;
   superheating said at least one pressurized steam flow;
   adding said at least one pressurized steam flow into the cooled cooling air downstream of the cooling air cooler;
   bypassing a second portion of said steam of said at least one pressurized steam flow into a working fluid flow of the at least one gas turbo group;
   branching off a part of compressed air at each of at least two different pressure levels;
   feeding each part of compressed air into an individual coolant system;
   providing at least one of the individual coolant systems with a cooling air cooler;
   passing one part of the branched off compressed air through said at least one cooling air cooler;
   providing at least two of the individual coolant systems with an individual cooling air cooler;
   passing the one part of compressed air through one of the cooling air coolers; and
   individually controlling a flow of pressurized feed water to each of the cooling air coolers to maintain a specific temperature of each cooling air flow downstream of each cooling air cooler.

7. A power plant, the power plant comprising:

at least one gas turbo group, the at least one gas turbo group including:
- at least one compressor;
- at least one combustor coupled with the at least one compressor; and
- at least one turbine coupled with the at least one combustor;

at least one coolant system provided to branch off at least one part flow of compressed air from the compressor and feeding said part flow of compressed air as cooling air to thermally loaded components of the gas turbo group, said gas turbo group further including:
- at least one cooling air cooler coupled with both a feed water container and the at least one compressor, the at least one cooling air cooler receiving pressurized feed water as a coolant from the feed water container and generating a pressurized steam flow while removing heat from the part flow of compressed air from the at least one compressor;

means for controlling the flow of pressurized feed water to maintain a specific temperature of the cooling air downstream the at least one cooling air cooler;

at least one line for feeding a first portion of the pressurized steam flow into a cooling air flow, said line being provided with a control means for the steam flow; and at least one bypass line coupled with the turbine, the at least one bypass line bypassing a second portion of the pressurized steam flow into a working fluid flow of the gas turbo group.

* * * * *